United States Patent [19]

Takiguchi

[11] Patent Number: 4,968,145
[45] Date of Patent: Nov. 6, 1990

[54] NON-CONTACTING REVOLVING SPEED DETECTING APPARATUS

[75] Inventor: Yoshihiro Takiguchi, Shizuoka, Japan

[73] Assignee: Hamamatsu Photonics K.K., Shizuoka, Japan

[21] Appl. No.: 186,346

[22] Filed: Apr. 26, 1988

[30] Foreign Application Priority Data

Apr. 28, 1987 [JP] Japan .................. 62-105271

[51] Int. Cl.$^5$ .............................. G01B 9/02
[52] U.S. Cl. .................. 356/354; 250/231.14
[58] Field of Search .......... 356/354, 355, 356, 28.5; 250/231 SE, 237 G

[56] References Cited

U.S. PATENT DOCUMENTS 3,836,257 9/1974 Matsumoto .................. 356/356
4,528,448 7/1985 Doggett .................. 250/237 G X
4,551,017 11/1985 Mannava et al. .................. 356/28.5

Primary Examiner—Davis L. Willis
Assistant Examiner—Matthew W. Koren
Attorney, Agent, or Firm—Finnegan, Henderson, Farabow, Garrett, and Dunner

[57] ABSTRACT

A non-contacting revolving speed detecting apparatus for detecting the speed of rotation of a rotary body includes a diffraction plate that may be attached to the surface of the rotary body, a light source for radiating monochromatic laser light onto the diffraction plate, a light detector for detecting an output diffraction pattern of reflected and diffracted light from the diffraction plate, and circuitry for processing an output signal from the light detector means to detect and display the speed of rotation of the rotary body in either a digital or an analog manner.

14 Claims, 3 Drawing Sheets

DIFFRACTION PLATE

OUTPUT DIFFRACTION PATTERN

DIFFRACTION PLATE

OUTPUT DIFFRACTION PATTERN

DIFFRACTION PLATE
(INTER SECT EACH OTHER
AT 30 DEGREES)

OUTPUT DIFFRACTION
PATTER

REVOLUTION CENTER

NON-CONTACTING REVOLVING SPEED DETECTING APPARATUS

BACKGROUND OF THE INVENTION

1. Field of the Invention

The present invention relates to a non-contacting revolving speed detecting apparatus for detecting the speed of rotation of a rotary body by use of a laser and reflected and diffracted light therefrom.

2. Description of the Prior Art

Detection of the revolving speed of a rotary body has been required in various fields, and revolving speed detecting apparatus is often an indispensable element in the implementation of control techniques. Accordingly, simple but highly accurate revolving speed detecting devices have been required.

Conventional devices for detecting revolving speed of a rotary body can be roughly grouped into two types, i.e., contact and non-contact. The contact-type revolving speed detecting device includes the dynamo-type that uses electromagnetic induction in which an induced voltage is monitored to detect the revolving speed of a rotary body on the basis of the relation between the revolving speed and the induced voltage and the disc-type that uses an encoder plate having small inertia torque which is attached to a rotary shaft so as to detect magnetically or optically the revolving speed of a rotary body from the state of the encoder plate.

There are several types of non-contacting revolving speed detecting devices. One type uses a reflector attached to a rotary body and irradiated by a light source provided separately from the reflector so that the intensity of light reflected from the reflector is detected by a photo detector. A second type uses a magnetic pickup attached in the vicinity of a rotary body. A signal generated from the pickup when the rotary body approaches the pickup is magnetically detected to detect the revolving speed of the rotary body.

All the foregoing detecting means have certain disadvantages. In the contact-type revolving speed devices, the revolving speed detecting device is directly attached to a rotatable shaft of a rotary body with the consequence that the attachment of the device affects the rotation of the rotary body and makes it more difficult to detect the revolving speed of the rotary body accurately. In the non-contacting revolving speed detecting apparatus, on the other hand, the positional relation among a light source, a reflector, and a light detector must be strictly determined. This gives rise to severe design requirements. In the device using magnetic detection, high accuracy is required in the attachment of a magnetic pickup to a rotary body. Accordingly, it is difficult to produce such a device that is simple and also is highly accurate.

SUMMARY OF THE INVENTION

An object of the present invention is to solve the problems described above in the prior art.

Another object of the present invention is a non-contacting revolving speed detecting apparatus that is easily attached to a rotary body and that has a high resolution capability.

A further object of the present invention is a non-contacting revolving speed detecting apparatus in which laser light is reflected onto a diffraction plate attached to a rotary body so that the revolving speed of the rotary body is detected by using a diffraction pattern of the light.

These and other objects are accomplished by a non-contact revolving speed detecting apparatus for detecting the speed of rotation of a rotary body comprising a diffraction plate adapted to be attached to the surface of the rotary body, a light source for radiating monochromatic light onto the diffraction plate, light detector means for detecting an output diffraction pattern of reflected and diffracted light from the diffraction plate, and means for processing an output signal from the light detector means to detect and display the speed of rotation of the rotary body.

BRIEF DESCRIPTION OF THE DRAWINGS

The manner by which the above and other objects are attained will be fully apparent from the following detailed description when considered in view of the drawings, wherein.

DETAILED DESCRIPTION OF THE PREFERRED EMBODIMENTS

The non-contacting revolving speed detecting apparatus according to the present invention comprises a diffraction plate attached to one surface of a rotary body to be measured. A light source radiates monochromatic laser light onto the diffraction plate and a light detector detects an output diffraction pattern of reflected and diffracted light from the diffraction plate. Processing means processes an output signal from the light detector to detect and display the revolving speed of the rotary body In the non-contacting revolving speed detecting apparatus according to the present invention, the diffraction pattern from the diffraction plate is detected by a light detector, the detected signal is converted into a pulse signal, and the pulse signal is integrated and displayed as an analog value. The pulse signal may also be counted by a counter and be displayed as a digital value. Thus, the revolving speed of the rotary body can be detected with high accuracy.

Figure 1:
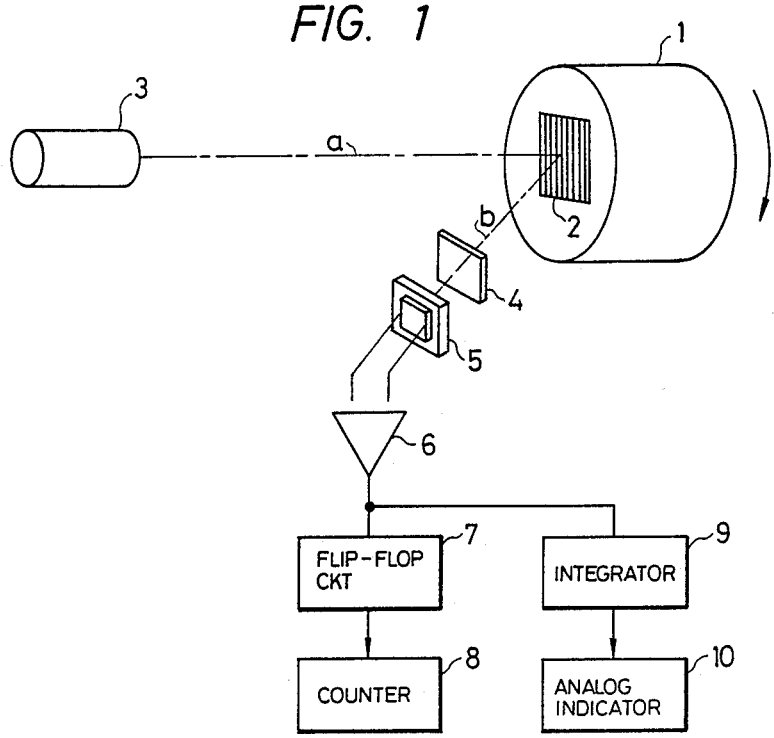
FIG. 1 is a view showing a basic embodiment of the non-contacting revolving speed detecting apparatus according to the present invention.

FIG. 1 is a view showing a basic embodiment of the non-contacting revolving speed detecting apparatus according to the present invention, which comprises a rotary body 1 having an attached sheet-like or plate-like metallic, glossy diffraction plate 2. The plate 2 has unevenness of a linearly formed slit-like pattern and is attached on the rotary body 1 in the vicinity of the center of rotation of the rotary body 1. A He-Ne laser light source 3 emitting collimated, monochromatic light and having an output of several milliwatts is focused on the plate 2. A wavelength selecting filter 4 cancels the influence of external light. The apparatus further includes a light detector 5 constituted by, for example, silicon photodiodes, a signal amplifier 6 a flip-flop circuit 7, a counter 8 having a digital display function, an integrator 9, and an analog indicator 10.

Figure 2:
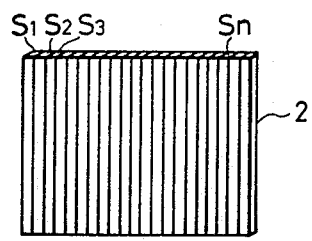
FIG. 2 is an enlarged view showing a diffraction plate used in the apparatus according to the present invention.

As shown in FIG. 2, the diffraction plate 2 to be attached on one surface of the rotary body 1 may be made of a piece of aluminum foil having a thickness of several tens of microns and having linearly formed parallel slits S1, S2, S3 . . . Sn.

Now, if laser light a is radiated at a desired angle from the He-Ne laser light source 3 in order to detect the revolving speed of the rotary body 1 which is rotating in the direction shown by an arrow, the diffraction plate 2 on the surface of the rotary body 1 is irradiated with the laser light a at a position in the vicinity of the center of rotation of the rotary body 1 to provide reflected and diffracted light from the diffraction plate 2. The output diffraction pattern varies depending on the shape of the diffraction pattern on the diffraction plate 2. In an embodiment where the diffraction plate 2 has a diffraction pattern as shown in FIG. 2, an output diffraction pattern is produced comprising a single line extending in the direction perpendicular to the direction of the slits in the diffraction plate 2.

Figure 4A:
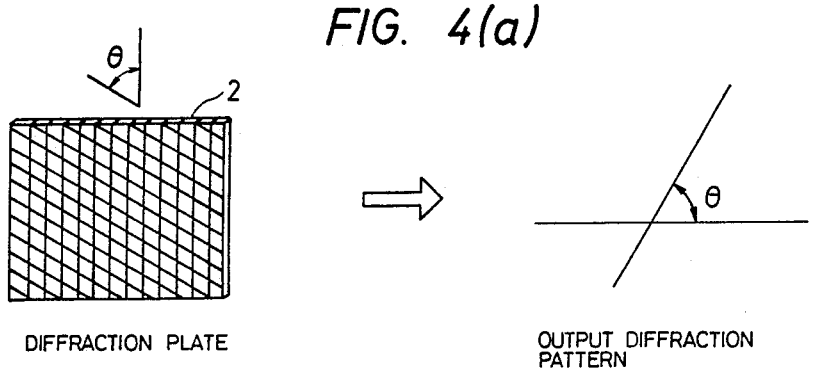
FIGS. 4(a) and (b) show examples of diffraction plates respectively having differently-shaped diffraction patterns and the output diffraction patterns therefrom.
Figure 4B:
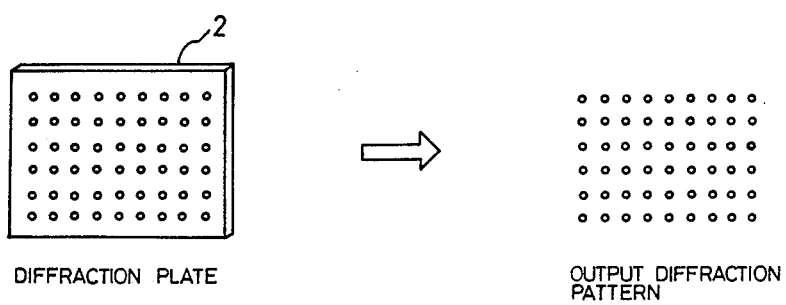

Other output diffraction patterns produced by diffraction plates with different diffraction patterns are illustrated by way of example in the views (a) and (b) of FIG. 4. That is, in FIG. 4(a), by use of a diffraction plate 2 having a diffraction pattern in which two kinds of linear patterns are made to intersect each other at an angle 8, an output diffraction pattern is obtained in which two linear patterns also intersect each other at the angle 8. If the diffraction plate 2 having that diffraction pattern is attached on the surface of the rotary body 1, the diffraction pattern of the two linear patterns appears while rotating. Further, as shown in FIG. 4(b), a dot diffraction pattern is formed from a dot pattern of the diffraction plate 2.

Figure 3:
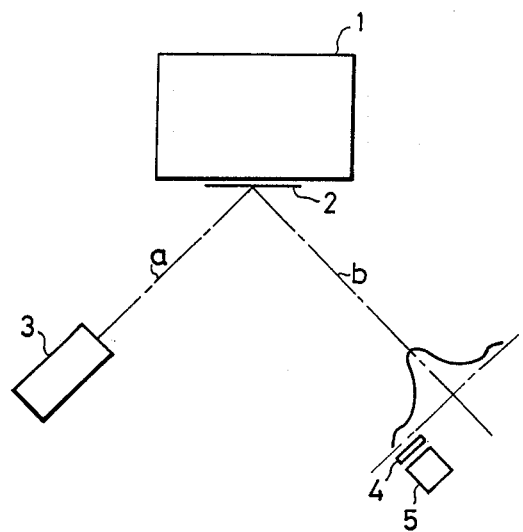
FIG. 3 is a view showing an arrangement of a laser light source and a light detector of the detecting apparatus according to the present invention.

Since the output linear diffraction pattern rotates as the rotary body 1 rotates in FIG. 1, if the light detector 5 constituted by silicon photodiodes is disposed after the wavelength selecting filter 4 so that a diffraction image is slightly shifted from the center of rotation b of the rotary body 1 as shown in FIG. 3, signal pulses corresponding to the rotation of the rotary body 1 can be detected by the light detector 5. In the case where such a diffraction plate 2 having an uneven linear pattern is used, the linear diffraction pattern passes twice through the light detector 5 through the wavelength selecting filter 4 when the rotary body 1 rotates once. Consequently, two signal pulses are obtained through photoelectric conversion by the light detector 5. The thus obtained pulse signals are amplified by the amplifier 6.

In the case of digital display of the speed of revolution, the output signal from the amplifier 6 is applied to the flip-flop circuit 7 on the succeeding step to cause the flip-flop circuit 7 to rise at a first pulse and to fall at a succeeding pulse, so that a shaped pulse can be obtained for every rotation of the rotary body 1. The generated, shaped pulses from the flip-flop circuit 7 are counted by the counter 8 to obtain the revolving speed of the rotary body 1 which is in turn displayed in a digital manner.

In the case of the analog display of the revolving speed, the output pulses produced from the amplifier 6 corresponding to the speed of revolution of the rotary body 1 are applied to the integrator 9 at the next stage to be integrated therein. The revolving speed of the rotary body 1 is displayed in an analog manner by the analog indicator 10, e.g., a meter, located in the succeeding stage.

The upper limit of the detectable revolving speed depends on the speed of response and the sensitivity of each of the light detector 5 and the signal processing circuits 6, 7, and 8. For example, if the speed of response is 10 microseconds, the revolving speed can be up to $10^6$ rps (revolutions per second). Further, the laser light source 3 may have any wavelength so long as the wavelength of the laser light source 3 agrees with the wavelength characteristic of the light detector 5.

Further, if an electronic gate circuit is incorporated as a counting circuit so that the count can be displayed at suitable intervals, rotational accuracy can be changed by determining the gating time corresponding to the speed of rotation of the rotary body 1. A diffraction plate having unevenness and a one-directional linearly-formed pattern is used in the foregoing embodiment. A diffraction plate having a pattern in which linear slits are cut to intersect each other at an angle of 60° with respect to the rotational center of diffracted light, signals with a phase difference of 90° therebetween are outputted by the two light detectors 5 to 5', so that highly accurate measurement can be performed by use of phase sampling between the two signals.

Although an example in which a diffraction plate is attached to a rotary body has been described in the foregoing embodiment, it is a matter of course that a pattern may be stamped directly on a surface of a rotary body.

Figure 7:
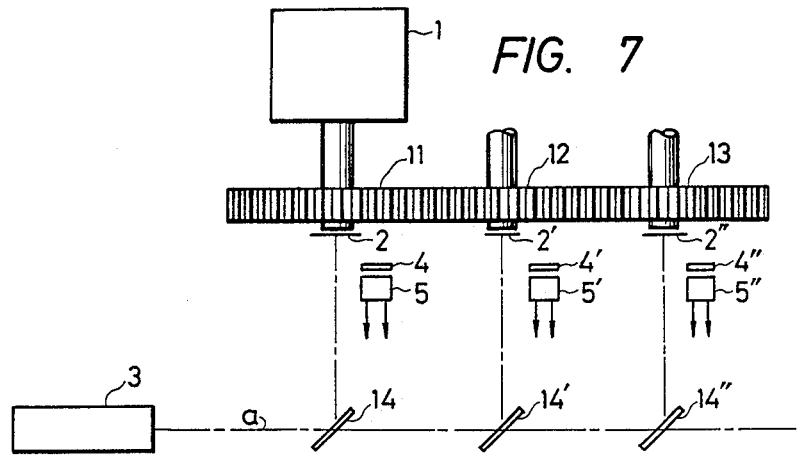
FIG. 7 is a view showing the arrangement in which the revolving speed is detected at multiple points by use of a single laser light source.

Referring to FIG. 7, another embodiment of the non-contacting revolving speed detecting apparatus according to the present invention will be described. In the drawing, the apparatus is provided with a rotary body 1, diffraction plates 2, 2' and 2'', a laser light source 3, wavelength selecting filters 4, 4' and 4'', light detectors 5, 5' and 5'', gears 11, 12 and 13, and light branching devices 14, 14' and 14''.

In the drawing, the rotational output of the rotary body 1 is transmitted in succession through the first, second, and third gears 11, 12, and 13, and the revolving speed of each of the gears 11, 12, and 13 may be detected. In that case, the single laser light source 3 is used as a common light source, the diffraction plates 2, 2' and 2'' are attached on the respective rotary shafts of the gears 11, 12, and 13, and the wavelength selecting filters 4, 4' and 4'' and the light detectors 5, 5' and 5'' are disposed in opposition to the diffraction plates 2, 2' and 2'', respectively. In detecting the revolving speed of each of the gears 11, 12, and 13 as the rotary body 1 rotates, when laser light a is emitted from the laser light source 3, the laser light a is made to branch by the light branching devices 14, 14' and 14'' disposed on the light path so as to be radiated onto the diffraction plates 2, 2' and 2''. Diffraction patterns reflected by the diffraction plates 2, 2' and 2'' are detected in the same manner as already described in the first embodiment and are processed by signal processing circuits in the succeeding stage so that the revolving speed of each of the gears 11, 12, and 13 can be detected with high accuracy in a digital manner or in an analog manner. In this embodiment, a single laser source suffices for detecting the sped of rotation at plural points, so that the apparatus can be made simple and inexpensive.

In the foregoing embodiments of the present invention, it is a matter of course that optical fibers can be used for transmission of light and at a pickup portion of diffracted light.

As described above, in the non-contacting revolving speed detecting apparatus according to the present invention, the revolving speed of a rotary body to be measured can be detected without applying any load to the rotary body, and the laser light can be radiated at a desired angle, so that a light source can be determined in accordance with the shape of the rotary body. At the same time, the light detectors can be set at desired positions in a region where diffraction patterns exist, so that the attachment of the light detectors is simple with no attachment error. Accordingly, the revolving speed can be detected with high accuracy.

Further, the revolving speed can be detected in a non-contacting state, so that the measurement can be carried out regardless of the conditions of the rotary body (high temperature, high voltage, and surface roughness). Further, the diffraction plates can be made simple in structure, so that an inexpensive non-contacting revolving speed detecting apparatus can be provided.

What is claimed is:

1. A non-contacting revolving speed detecting apparatus for detecting the speed of rotation of a plurality of rotary bodies comprising:
   a plurality of diffraction plates, each of said diffraction plates being associated with a different one of said plurality of rotary bodies and adapted to be provided on the surface of the associated rotary body;
   a light source for radiating monochromatic light;
   means in the path of said light for reflecting said light to each of said diffraction plates;
   a plurality of light detector means, each of said plurality of light detector means being respectively associated with a different one of said diffraction plates for detecting an output diffraction pattern of diffracted light from said associated diffraction plate and for generating a corresponding output signal; and
   means for processing each of said corresponding respective output signals from said plurality of light detector means to detect the speed of rotation of each of said plurality of rotary bodies.

2. A non-contacting revolving speed detecting apparatus according to claim 1, further including a plurality of wavelength selecting filters each of said filters being associated with a different one of said light detector means to remove unwanted external light from the light received by said associated light detector means.

3. A non-contacting revolving speed detecting apparatus according to claim 1, in which optical fiber is used for transmission of light and at pickup portion of said diffracted light.

4. A non-contacting revolving speed detecting apparatus for detecting the speed of rotation of a rotary body comprising:
   a diffraction plate adapted to be provided on the surface of the rotary body, said diffraction plate including a metallic, glossy sheet-like member having a pattern of unevenness formed by a dot pattern;
   a light source for radiating monochromatic light onto said diffraction plate;
   light detector means for detecting an output diffraction pattern of diffracted light from said diffraction plate and for generating a corresponding output signal; and
   means for processing said output signal from said light detector means to detect the speed of rotation of the rotary body.

5. A non-contacting revolving speed detecting apparatus according to claim 4, wherein said light source comprises a laser.

6. A non-contacting revolving speed detecting apparatus according to claim 5, wherein said laser in a He-Ne laser.

7. A non-contacting revolving speed detecting apparatus according to claim 5, wherein said laser is a semiconductor laser.

8. A non-contacting revolving speed detecting apparatus for detecting the speed of rotation of a rotary body comprising:
   a diffraction plate adapted to be provided on the surface of the rotary body and stamped on the rotary body to form a pattern of unevenness formed as a dot pattern;
   a light source for radiating monochromatic light onto said diffraction plate;
   light detector means for detecting an output diffraction pattern of diffracted light from said diffraction plate and for generating a corresponding output signal; and
   means for processing said output signal from said light detector means to detect the speed of rotation of the rotary body.

9. A non-contacting revolving speed detecting apparatus according to claim 8, wherein said light source comprises a laser.

10. A non-contacting revolving speed detecting apparatus according to claim 9, wherein said laser is a He-Ne laser.

11. A non-contacting revolving speed detecting apparatus according to claim 9, wherein said laser is a semiconductor laser.

12. A non-contacting revolving speed detecting apparatus for detecting the speed of rotation of a rotary body comprising:
   a diffraction plate adapted to be provided on the surface of the rotary body;
   a light source for radiating monochromatic light onto said diffraction plate;
   light detector means for detecting an output diffraction pattern of diffracted light from said diffraction plate and for generating a corresponding output signal, said light detector means including a plurality of light detectors disposed in the path of said diffracted light having selected phase relations between each of said plurality of light detectors; and
   means for processing said output signal from said light detector means to detect the speed of rotation of the rotary body.

13. A non-contacting revolving speed detecting apparatus for detecting the speed of rotation of a rotary body comprising:
   a diffraction plate adapted to be provided on the surface of the rotary body;
   a light source for radiating monochromatic light onto said diffraction plate;

light detector means for detecting an output diffraction pattern of diffracted light from said diffraction plate and for generating a corresponding output signal; and means for processing said output signal from said light detector means to detect the speed of rotation of the rotary body, said processing means including means for amplifying said output signal, means for converting said amplified output signal into corresponding digital signals, and means responsive to said digital signals for digitally displaying the speed of rotation of the rotary body.

14. A non-contacting revolving speed detecting apparatus for detecting the speed of rotation of a rotary body comprising:

a diffraction plate adapted to be provided on the surface of the rotary body;

a light source for radiating monochromatic light onto said diffraction plate;

light detector means for detecting an output diffraction pattern of diffracted light from said diffraction plate and for generating a corresponding output signal; and means for processing said output signal from said light detector means to detect the speed of rotation of the rotary body, said processing means including means for amplifying said output signal and analog display means responsive to said amplified output signal for displaying the speed of revolution of said rotary body in an analog manner.

* * * * *

UNITED STATES PATENT AND TRADEMARK OFFICE
CERTIFICATE OF CORRECTION

Figure 5:
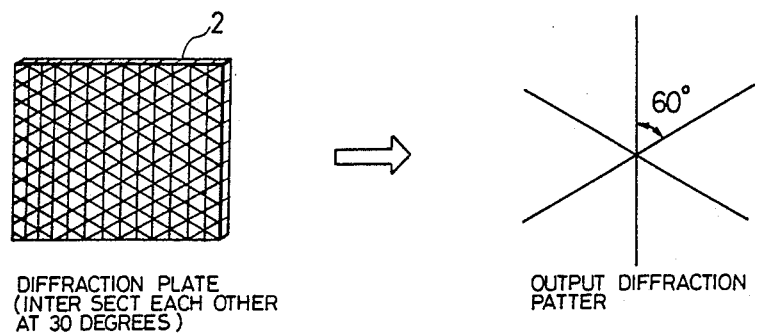
FIG. 5 is a view showing a diffraction plate having a diffraction pattern of a combination of 30° divisional lines and the output diffraction pattern therefrom.

PATENT NO.  : 4,968,145
DATED       : November 06, 1990
INVENTOR(S) : Yoshihiro Takiguchi It is certified that error appears in the above-identified patent and that said Letters Patent is hereby corrected as shown below:

Column 4, Line 28, after "60°" insert -- , as shown in Fig. 5, amy be used to obtain 6 pulses for every one rotation of a rotary body, so they resolution can be improved three times.

Figure 6:
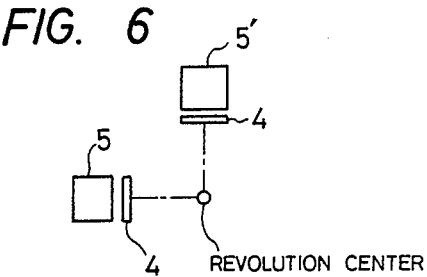
FIG. 6 is a view showing an arrangement in which two light detectors are disposed for one output diffraction pattern with a phase difference of 90° therebetween.

As shown in Fig. 6, if two light detectors 5 and 5' are disposed together with wavelength selecting filters 4 and 4', respectively, at positions separated from each other by 90°--;

Claim 4, Column 5, Line 68, change "uneveness" to --unevenness--;

UNITED STATES PATENT AND TRADEMARK OFFICE
CERTIFICATE OF CORRECTION

PATENT NO. : 4,968,145

DATED : November 06, 1990

INVENTOR(S) : Yoshihiro Takiguchi

It is certified that error appears in the above-identified patent and that said Letters Patent is hereby corrected as shown below:

Claim 6, Column 6, Line 14, change "in" to --is--;

Signed and Sealed this

Seventeenth Day of November, 1992

Attest:

DOUGLAS B. COMER

*Attesting Officer*  *Acting Commissioner of Patents and Trademarks*